United States Patent [19]

Takada

[11] 4,410,202
[45] Oct. 18, 1983

[54] PASSIVE VEHICLE OCCUPANT RESTRAINT BELT SYSTEM

[76] Inventor: Juichiro Takada, 3-12-1, Schinmachi, Setagayaku, Tokyo, Japan

[21] Appl. No.: 313,369

[22] Filed: Oct. 21, 1981

[30] Foreign Application Priority Data

Oct. 30, 1980 [JP] Japan .......................... 55-154226[U]
Jun. 23, 1981 [JP] Japan ............................ 56-91757[U]

[51] Int. Cl.³ ............................................. B60R 21/10
[52] U.S. Cl. ................................... 280/804; 242/68.5
[58] Field of Search ...................... 280/804, 807, 802; 242/68.5; 297/469

[56] References Cited

U.S. PATENT DOCUMENTS 747,598 12/1903 Fales ................................... 242/68.5
4,222,588 9/1980 Suzuki et al. ....................... 280/804

FOREIGN PATENT DOCUMENTS 2156926 5/1973 Fed. Rep. of Germany ...... 280/804
55-47932 4/1980 Japan ................................. 280/804
55-119544 9/1980 Japan ................................. 280/804

Primary Examiner—Joseph F. Peters, Jr.
Assistant Examiner—Ross Weaver
Attorney, Agent, or Firm—Brumbaugh, Graves, Donohue & Raymond

[57] ABSTRACT

A drive device for a movable belt guide in a passive vehicle occupant restraint belt system which includes a rotatable sprocket wheel having a multiplicity of sprocket teeth that provide positive winding and unwinding of a flexible drive tape having holes that receive the sprocket teeth.

8 Claims, 12 Drawing Figures

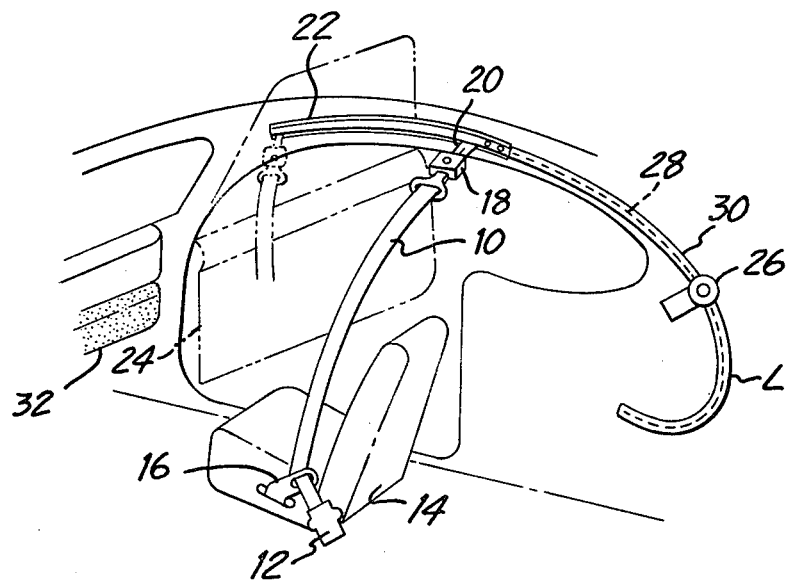
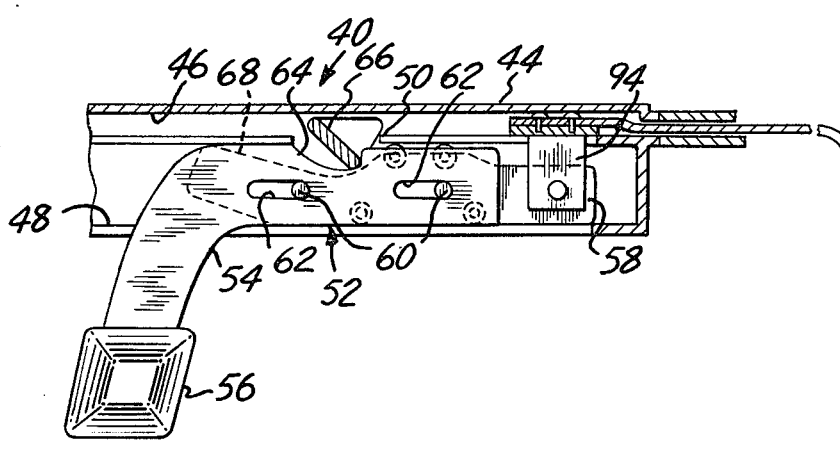
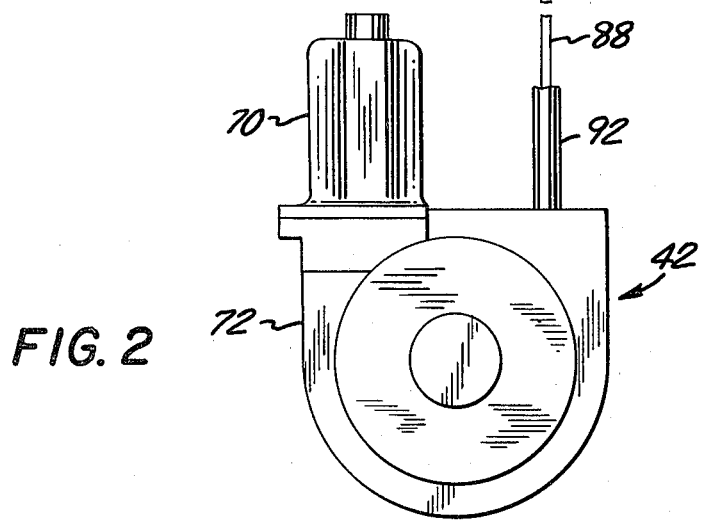
FIG. 1 PRIOR ART
FIG. 2

PASSIVE VEHICLE OCCUPANT RESTRAINT BELT SYSTEM

The present invention relates to vehicle occupant restraint belt systems of the so-called passive type, that is, the type of system in which the belt automatically transfers between a configuration in which the occupant is released and a configuration in which he or she is restrained in response to closing and opening of the vehicle door.

BACKGROUND OF THE INVENTION

There have been many proposals in recent years for passive type vehicle occupant restraint belt systems. Such proposals have been prompted by recognition that conventional systems in which the belt must be done up and undone by the occupant are often not used because the occupant finds it inconvenient to connect and disconnect the belt each time he or she enters or leaves the vehicle. The most common type of passive restraint belt system involves a movable belt transfer guide (either a guide ring or a movable anchor) located either inboard or outboard of the vehicle seat and movable back and forth in a manner to position the belt in a releasing or restraining configuration.

FIG. 1 of the accompanying drawings illustrates schematically an exemplary known passive belt system. A shoulder belt 10 leads from an emergency locking retractor 12 affixed to the vehicle floor inboard of the seat 14 outwardly through a belt guide 16 to an emergency release buckle 18 on a movable anchor 20. The anchor 20 slides along a guide rail 22 on the vehicle roof above the door 24 and is driven between a forward release position and a rearward restraint position by a drive device that comprises a gear-reduced reversible electric motor unit 26 that drives a drive wire 28. The wire is constrained to move along a predetermined path of fixed length by a sheath 30. Commonly, the drive wire is a so-called racked wire, an element that comprises a core wire and a helically wrapped tooth wire wound around the core wire. The output gear of the drive unit 26 drives the racked wire in opposite directions in response to energization of the motor by a circuit that includes a door switch for detecting opening and closing of the door 24. In this example of a passive belt system, the belt 10 is a shoulder belt which restrains the upper part of the vehicle occupant's body. The lower portion of the occupant's body is protected in the event of a collision or abrupt stop by an energy-absorbing knee bolster 32.

The restraint system shown in FIG. 1 is merely exemplary of a variety of two point and three point passive systems that have been proposed heretofore. Other systems having movable belt transfer guides on the door or adjacent the inboard side of the seat and driven by a drive device are known in the prior art.

One problem with many such systems involves the drive wire, such as a racked wire, for moving the belt guide member or a movable anchor. Such drive wires usually include a portion of a length slightly greater than the distance along which the movable belt guide ring or movable anchor moves between the restraining and releasing positions that extends like a tail out from the opposite side of the motor or other drive device from that portion leading from the motor to the guide ring or movable anchor. In FIG. 1 the portion just referred to is designated by the letter L and is guided within a sheath suitably installed within the side body panel adjacent the outboard side of the rear seat. The portion L and its equivalent in other restraint systems cause difficulties in the design and installation of the system. For one thing, the drive motor often has to be located at some distance from the belt transfer guide in order that the tail portion L of the wire can be located in a place in the vehicle body where there is room and where it does not interfere with other vehicle systems. This means that the length of drive wire is increased and the installation of the system becomes more complicated and costly. Moreover, the extra length of wire and sheathing increases costs, particularly with the use of relatively expensive racked wire material.

SUMMARY OF THE INVENTION

There is provided, in accordance with the present invention, a passive vehicle occupant restraint belt system which is of comparatively simple and durable construction, can be manufactured and installed at relatively low cost, and is more compact than state-of-the-art systems of comparable design and mode of operation. In particular, a restraint belt system, in accordance with the present invention, comprises a belt guide engaging the belt and movable between restraint and release locations in the vehicle in which it holds the belt in occupant-restraining and occupant-releasing configurations, respectively. A reversible drive device is coupled by a flexible drive element to the belt guide and is operable in response to opening and closing of the vehicle door to move the guide between the release and restraint locations. The invention is characterized, more particularly, in that the drive device includes a rotatable sprocket wheel having a multiplicity of teeth extending substantially radially outwardly with respect to the axis of rotation of the wheel and in that the drive element is a tape having one end fastened to the belt transfer guide and the other end fastened to the sprocket wheel. The tape has holes in at least a portion thereof adjacent the end remote from the guide and adapted to receive the sprocket teeth, such that the tape is wound onto and unwound from the sprocket wheel to move the guide between the restraint and release positions upon rotation of the sprocket wheel.

In a preferred embodiment, the invention is further characterized in that the spacing of the holes in the tape varies along the length in correspondence with the number of wraps of the tape underlying any selected pair of holes. The tape includes a reinforcing core and a covering of polymeric material encasing the core. The core may be either a multiplicity of wires or strands of synthetic fibers or a thin metal band. Advantageously, a presser shoe resiliently urges the tape toward the axis of the sprocket wheel at a region proximate the place the tape winds onto and unwinds from the sprocket wheel, thereby ensuring reception of the sprocket teeth in the tape holes with consequent positive winding and unwinding of the tape tightly and without kinking. The presser shoe is a member having a medial slot through which the sprocket teeth can pass and a pair of flanges on either side of the slot having arcuate faces engaging the tape. The system may further be characterized in that there is a guide shoe located along the path of the tape between the presser shoe and a guideway in the casing for guiding the tape toward and away from the sprocket wheel, the guide shoe being pivoted at a location remote from the presser shoe and the presser shoe engaging a portion of the guide shoe that is spaced apart from the pivot mounting. In this preferred embodiment, the guide shoe pivots in correspondence with movements of the presser shoe as the tape winds onto and unwinds from the sprocket wheel.

DESCRIPTION OF THE DRAWINGS

FIG. 1 is a pictorial view in schematic form of an exemplary passive vehicle occupant restraint belt system of a type known in the prior art;

FIG. 2 is a side elevational view of a portion of a restraint belt system according to the invention—part of the guide rail for the moving anchor of the system is broken away in cross section;

DESCRIPTION OF EXEMPLARY EMBODIMENTS

Figure 3:
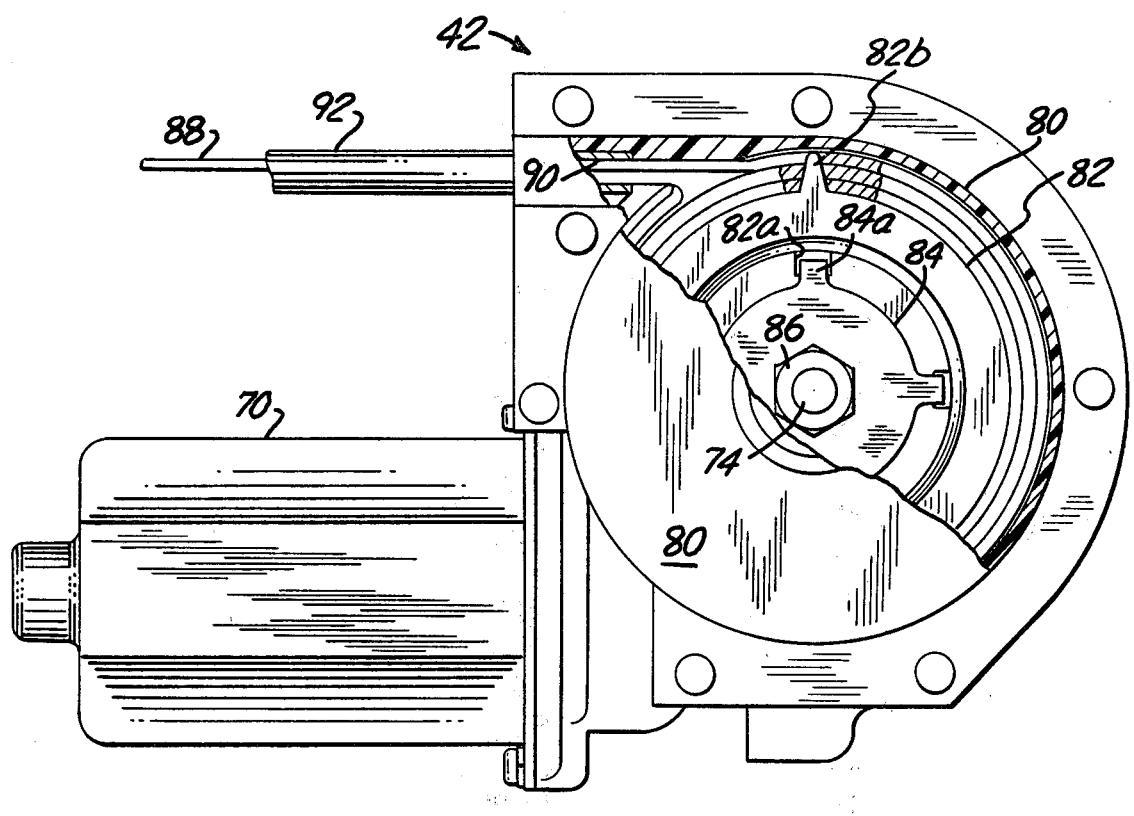
FIG. 3 is a side elevational view of the sprocket wheel output and the tape drive element of FIG. 2 shown on a larger scale and with portions broken away in cross section.
Figure 4:
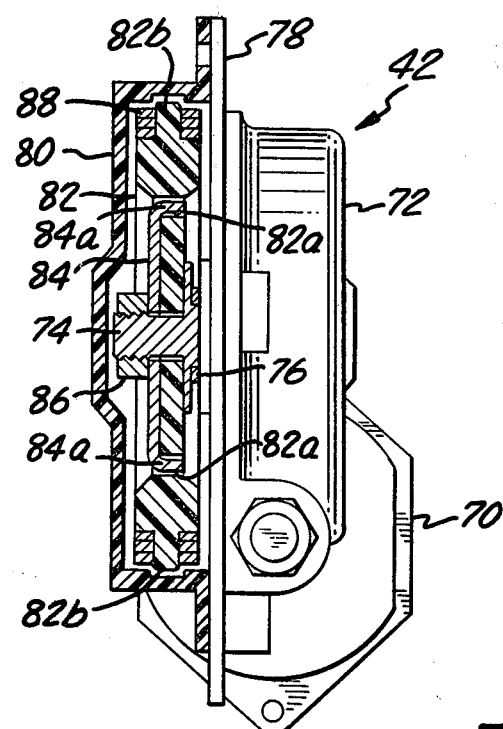
FIG. 4 is an end cross-sectional view of the drive unit shown in FIG. 3.

The embodiment of the invention illustrated in FIGS. 2 to 6 of the drawings comprises a belt transfer guide assembly 40 and a drive unit 42. The guide assembly 40 includes a guide rail 44 in the form of a channel divided into a comparatively small compartment or passage 46 and a somewhat larger compartment or passage 48 by a dividing wall 50. The larger compartment 48 serves as a track for a movable anchor 52 that includes an anchor member 54 carrying an emergency release buckle 56 on an arm portion that extends out of the compartment 48 through a slot running along the bottom of the guide rail. The movable anchor further includes an actuating member 58 that is connected to the anchor member 54 by pins 60 that are received in elongated slots 62 in the anchor member, thereby coupling the actuating member 58 to the anchor member 54 for relative lengthwise motion for a distance equal to the lengths of the slots 62. A locking notch 64 in the upper edge of the locking member receives a locking pawl 66 mounted in triangular slots in the rail for movement between latching and unlatching positions. In the latching position shown in FIG. 2, the pawl engages a locking shoulder on the locking notch 64 and prevents the anchor member 54 from moving from right to left. Meanwhile, the actuating member 50 has been pulled from left to right by the drive unit to locate a camming notch 68 in register with the locking notch 64 of the anchor member 54, thereby allowing the pawl 66 to fall by gravity into the latched position.

When the actuating member 58 is pushed by the drive assembly (as described below) from right to left, the lost motion afforded by the pins 60 and slots 62 enables the actuating member 58 to move to the left, relative to the anchor member 54, and the camming notch 68 on the actuating member 58 lifts the pawl 66 up out of the locking notch 64 of the anchor member. When the pins 60 move to the full extent leftward in the slots 62, the pawl 66 is fully unseated from the locking notch 64, and the actuating member 58 commences pushing the anchor member 54 to the left toward the release position (not shown). The movable anchor assembly shown in FIG. 2 is merely exemplary of a variety of moving belt transfer guides for passive belt systems with which the present invention may be employed. For example, the invention can be used to move movable belt guide rings and movable anchors carried by guide rails affixed in various locations in the vehicle, such as on the door panel, on a console between the vehicle seats or on the inboard side of the vehicle seat. It can also be used to pivot belt transfer arms and levers.

The drive unit 42 (see FIGS. 3 and 4) comprises a reversible electric motor 70 that is energized, usually through a double-pole, double-throw door switch, to operate in one direction when the vehicle door is opened and in the reverse direction when the door is closed. The motor 70 drives a speed reduction gear train (details not shown) carried within a housing 72 and having an output shaft 74 that is supported within a bushing 76 in a wall 78 that is common to the housing 72 for the gear train and a housing 80 for a sprocket wheel 82. The sprocket wheel 82 is connected to the shaft 74 by a coupling disc 84 and is held in place on the shaft by a nut 86 that is threaded onto the end of the shaft. Flats on the shaft connect the coupling disc to the shaft for rotation, and tabs 84a on the coupling disc extend into slots 82a on the sprocket wheel.

Figure 5:
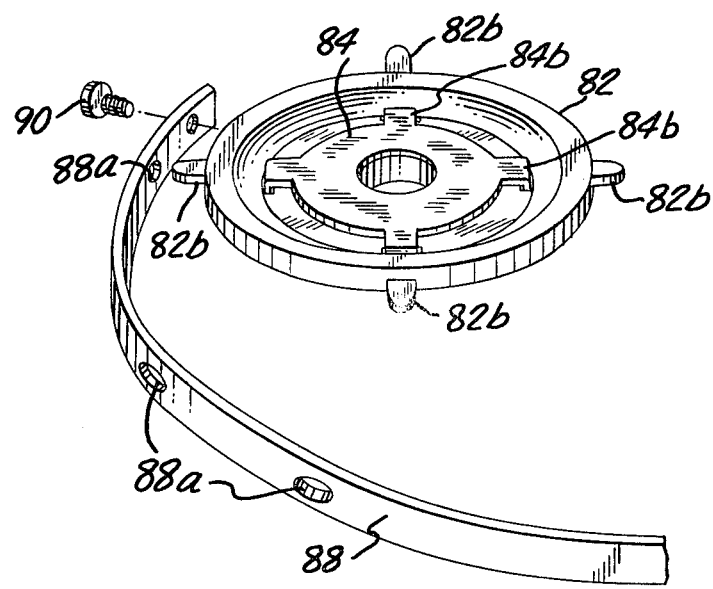
FIG. 5 is an exploded pictorial view of one embodiment of sprocket wheel and drive tape.
Figure 6:
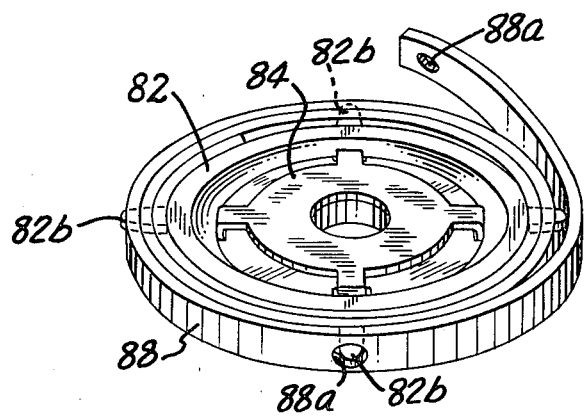
FIG. 6 is a pictorial view of the sprocket wheel and drive tape shown in FIG. 5 as assembled.

The sprocket wheel 82 has a multiplicity of sprocket teeth 82b. As shown in FIG. 5, a drive tape 88 is fastened, such as by a screw 90, to the perimeter of the sprocket wheel 82. The drive tape 88 has a multiplicity of longitudinally spaced-apart holes 88a that receive the teeth on the sprocket wheel. The distance between adjacent holes 88a in the tape corresponds to the circumferential distance between the sprocket teeth. As is apparent from FIG. 6 of the accompanying drawings, when a number of turns of the drive tape 88 are wound on the sprocket wheel, the circumferential distance measured along the tape between the sprocket teeth increases. Accordingly, it is preferable that the distance between the holes 88a vary in accordance with the number of turns of the tape wrapped on the wheel underneath each pair of adjacent holes.

The drive tape 88 is guided out of the casing 80 through a guideway 90 and runs through a sheath 92 that extends the entire distance between the drive unit 42 and the guide rail 44 so that it maintains a constant length of tape between the drive unit and the belt transfer guide. The free end of the tape is fastened to a coupling element 94 that, in turn, is connected to the actuating member 58 of the movable anchor assembly (see FIG. 2).

When the motor 70 is energized in a direction such that the sprocket wheel 82 is rotated counterclockwise (with reference to FIG. 3), thereby to unwind the drive tape 88 from the sprocket wheel, the movable anchor assembly is unlatched from the restraint position shown in FIG. 2 and moved to the left (with reference to FIG. 2) to the release position at the front end of the guide rail. The motor 70 is stopped at the release position in a suitable known manner, such as by limit switches associated with the drive unit, the drive tape or the guide. When the door is reclosed, the motor 70 is energized in the opposite direction, thereby rotating the sprocket wheel 82 clockwise (with reference to FIG. 3), winding the drive tape 88 back onto the sprocket wheel and in the process pulling the movable anchor assembly back to the restraint position in which the anchor member 54 is securely held in locked condition by the pawl 66. The motor is stopped by a limit switch.

The tape itself can be reasonably characterized as essentially flexible in nature, a property it must possess in order that it can be wound easily onto the sprocket wheel. On the other hand, it has, of course, sufficient stiffness to enable it to push the transfer guide when it is driven by the sprocket wheel in the unwinding direction. To this end, the sheath 92 and the compartment 46 of the guide rail constrain the tape to move along a predetermined path and prevent it from buckling so it can push the movable anchor from the restraint to the release position.

Figure 7:
FIG. 7 is a cross-sectional view of one embodiment of drive tape useful in the invention.
Figure 8:
FIG. 8 is a cross-sectional view of an alternative form of drive tape.

The desired characteristics for the tape are preferably obtained from a composite construction. As shown in FIG. 7, the tape comprises a thin metal band 88b encased within a casing 88c of polymeric material, such as nylon or polyurethane. The covering 88c of polymeric material keeps friction low, provides wear resistance, and reduces noise. Alternatively, a tape 88' of polymeric material strengthened and dimensionally stabilized by wire or synthetic fiber reinforcing strands 88b' (see FIG. 8) may be used. The cross-sectional shape of the tape can be rectangular (as shown), trapezoidal, or oval.

The embodiment shown in FIGS. 9 to 12 is similar in principle and in most structural aspects to the embodiment of FIGS. 1 to 6. It comprises a motor 100, a speed reduction gear train unit 102 and a sprocket wheel drive output unit 104. A sprocket wheel 105 composed of a metal disc 106 affixed on the output shaft 108 for rotation therewith and plastic discs 110 and 112 fastened together face to face by screws 114 is held on the shaft by a nut 116. The metal disc 106 has a multiplicity of equally spaced-apart outwardly extending sprocket teeth 106a. A drive tape 118 is fastened by a screw 120 to the sprocket wheel 105 and leads off the wheel out through a guideway 122 and thence through a sheath 124 to the belt transfer guide assembly of the passive system (not shown).

To ensure that the path of drive tape 118 between the sprocket wheel 105 and the guideway 122 is controlled and consistent from cycle to cycle, a presser shoe 126 is urged by a spring 128 toward a portion of the sprocket wheel near the point where the tape leaves the wheel. A guide shoe 130 pivots at one end on a pivot pin 132 and is arranged to pivot toward and away from the sprocket wheel by means of reception of a rib 134 in a notch 136 in the presser shoe 126. The surfaces of the presser shoe 126 and guide shoe 130 that face the sprocket wheel are curved to match generally the profile of the sprocket wheel, and each shoe has a slot, 126a and 130a, respectively, that allows the sprocket teeth 106a to pass.

Figure 9:
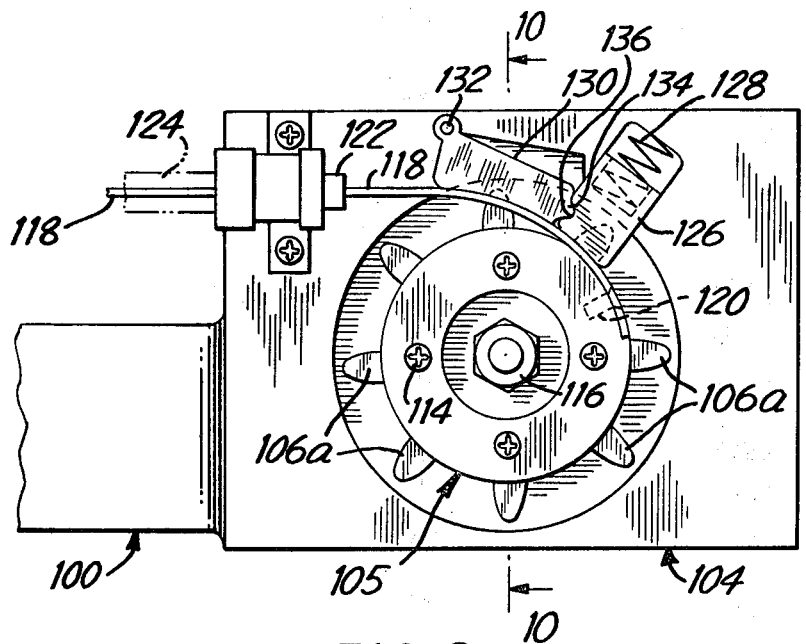
FIG. 9 is a side elevational view of another embodiment of drive unit according to the present invention.
Figure 10:
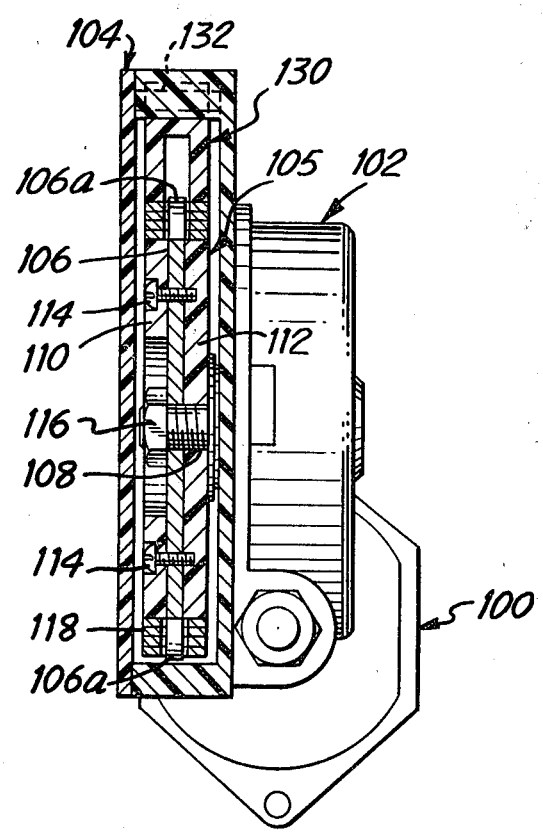
FIG. 10 is an end cross-sectional view of the drive unit shown in FIG. 9 taken generally along the lines 10—10 of FIG. 9 and in the direction of the arrows.
Figure 11:
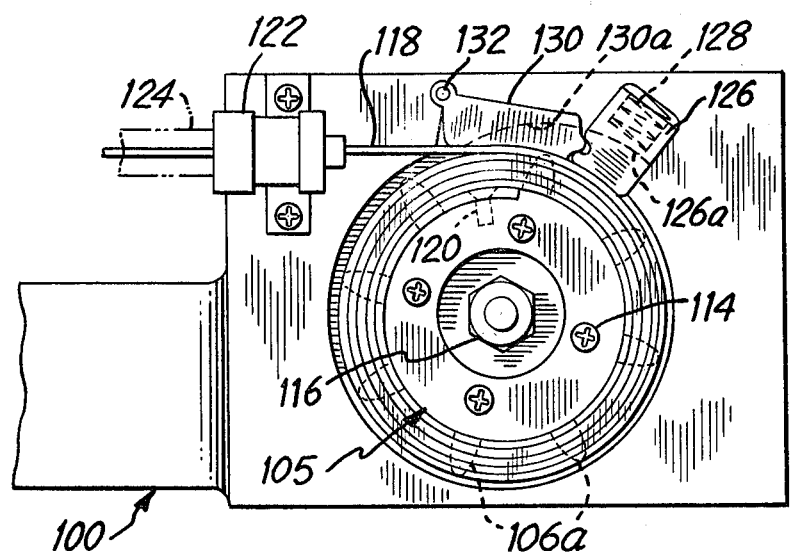
FIG. 11 is a side elevational view similar to FIG. 9 except that several turns of tape are wound on the sprocket wheel.
Figure 12:
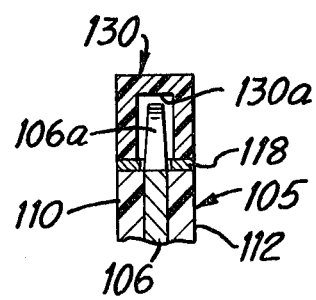
FIG. 12 is a fragmentary cross-sectional view of the guide shoe of the embodiment of FIGS. 9 to 11.

As shown in FIG. 9, when most of the length of tape that winds onto and unwinds from the sprocket wheel is unwound, the shoes 126 and 130 are urged inwardly by the spring 128. As the tape is wound onto the sprocket wheel, the springs yields and allows the tape to be wound onto the reel, but nonetheless smoothly guides the tape into firmly wrapped coils on the sprocket wheel, as shown in FIG. 11.

It will be apparent to those skilled in the art that only one presser shoe can be used to control the winding and unwinding of the tape, even though the arrangement illustrated in the drawings is preferred. Also, the spring can be associated with either of the shoes 126 or 130, or springs can be used with both shoes.

Thus, the present invention provides a substantial improvement in passive restraint belt systems in that it is of relatively small size and can be installed close to the belt transfer guide assembly. The invention is of relatively simple construction, can be manufactured at relatively low cost and takes comparatively little time to install, with consequent additional cost savings. The drive tape is highly durable and runs smoothly and quietly.

The above-described embodiments of the invention are intended to be merely exemplary, and numerous variations and modifications will be readily apparent to those skilled in the art without departing from the spirit and scope of the invention.

I claim:

1. A passive occupant restraint belt system for vehicles comprising a belt, a belt transfer guide engaging the belt and movable between restraint and release locations in the vehicle in which it holds the belt in occupant-restraining and occupant-releasing positions, respectively, and a reversible drive device coupled by a flexible drive element to the belt guide and operable in response to opening and closing of the vehicle door to move the guide between the release and restraint locations characterized in that the drive device includes a rotatable sprocket wheel having a multiplicity of teeth extending substantially radially outwardly with respect to the axis of rotation of the wheel and the drive element is a tape having one end fastened to the guide and the other end fastened to the sprocket wheel and having spaced-apart holes in at least the portion thereof adjacent the said other end adapted to receive the sprocket teeth such that the tape is wound onto and unwound from the sprocket wheel to move the guide between said locations upon rotation of the sprocket wheel.

2. A system according to claim 1 and further characterized in that the spacing of the holes in the tape varies along the length in correspondence with the number of wraps of the tape underlying any selected pair of adjacent holes.

3. A system according to claim 1 or claim 2 and further characterized in that the tape includes a reinforcing core and a covering of polymeric material encasing the core.

4. A system according to claim 3 and further characterized in that the core is made up of a multiplicity of strands.

5. A system according to claim 3 and further characterized in that the core is a thin metal band.

6. A system according to claim 1 or 2 and further characterized in that a presser shoe resiliently urges the tape toward the sprocket wheel at a region proximate to the place where the tape winds onto and unwinds from the wheel, thereby ensuring consistent and controlled winding and unwinding of the tape.

7. A system according to claim 6 and further characterized in that the presser shoe is a member having a medial slot through which the sprocket teeth can pass and a pair of flanges on either side of the slot having arcuate faces engaging the tape.

8. A system according to claim 7 and further characterized in that there is a guide shoe located along the path of the tape between the presser shoe and a guideway for the tape adjacent the sprocket wheel, in that the guide shoe is pivoted at a location remote from the presser shoe and in that the presser shoe engages a portion of the guide shoe that is spaced apart from the pivot, whereby the guide shoe pivots in correspondence with movements of the presser shoe as the tape wind onto and unwinds from the sprocket wheel.

* * * * *